US008464271B2

(12) United States Patent
Eichenberger et al.

(10) Patent No.: US 8,464,271 B2
(45) Date of Patent: *Jun. 11, 2013

(54) RUNTIME DEPENDENCE-AWARE SCHEDULING USING ASSIST THREAD

(75) Inventors: Alexandre E. Eichenberger, Chappaqua, NY (US); Kathryn M. O'Brien, South Salem, NY (US); Xiaotong Zhuang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,515

(22) Filed: Apr. 10, 2012

(65) Prior Publication Data

US 2012/0204189 A1      Aug. 9, 2012

Related U.S. Application Data

(63) Continuation of application No. 12/435,809, filed on May 5, 2009, now Pat. No. 8,214,831.

(51) Int. Cl.
*G06F 9/46* (2006.01)
*G06F 13/00* (2006.01)

(52) U.S. Cl.
USPC .......................................... 718/106; 711/168

(58) Field of Classification Search
None
See application file for complete search history.

(56) References Cited

U.S. PATENT DOCUMENTS

| | | | |
|---|---|---|---|
| 5,201,057 A | 4/1993 | Uht | |
| 5,987,254 A | 11/1999 | Subrahmanyam | |
| 6,065,105 A | 5/2000 | Zaidi et al. | |
| 6,931,514 B2 | 8/2005 | Shibayama et al. | |
| 7,418,583 B2 | 8/2008 | Shibayama et al. | |
| 7,950,012 B2 * | 5/2011 | Tirumalai et al. | ............. 718/102 |
| 2002/0035663 A1 | 3/2002 | Finn et al. | |
| 2002/0052856 A1 | 5/2002 | Satoh | |

(Continued)

FOREIGN PATENT DOCUMENTS

WO      WO 2007/131224 A2      11/2007

OTHER PUBLICATIONS

USPTO U.S. Appl. No. 12/435,809, 2 pages.
USPTO U.S. Appl. No. 12/717,985, 1 page.

(Continued)

*Primary Examiner* — Jennifer To
*Assistant Examiner* — Wissam Rashid
(74) *Attorney, Agent, or Firm* — Francis Lammes; Stephen J. Walder, Jr.; William J. Stock

(57) ABSTRACT

A runtime dependence-aware scheduling of dependent iterations mechanism is provided. Computation is performed for one or more iterations of computer executable code by a main thread. Dependence information is determined for a plurality of memory accesses within the computer executable code using modified executable code using a set of dependence threads. Using the dependence information, a determination is made as to whether a subset of a set of uncompleted iterations in the plurality of iterations is capable of being executed ahead-of-time by the one or more available threads in the data processing system. If the subset of the set of uncompleted iterations in the plurality of iterations is capable of being executed ahead-of-time, the main thread is signaled to skip the subset of the set of uncompleted iterations and the set of assist threads is signaled to execute the subset of the set of uncompleted iterations.

18 Claims, 16 Drawing Sheets

U.S. PATENT DOCUMENTS

| | | | |
|---|---|---|---|
| 2002/0111699 | A1 | 8/2002 | Melli et al. |
| 2004/0054990 | A1 | 3/2004 | Liao et al. |
| 2004/0057495 | A1 | 3/2004 | Lee et al. |
| 2004/0128448 | A1 | 7/2004 | Stark et al. |
| 2004/0205740 | A1 | 10/2004 | Lavery et al. |
| 2005/0071841 | A1 | 3/2005 | Hoflehner et al. |
| 2006/0047495 | A1 | 3/2006 | Sanchez et al. |
| 2007/0174555 | A1 | 7/2007 | Burtscher et al. |
| 2008/0162889 | A1 | 7/2008 | Cascaval et al. |
| 2009/0138862 | A1 | 5/2009 | Tanabe et al. |
| 2010/0287550 | A1 | 11/2010 | Eichenberger et al. |
| 2011/0219222 | A1 | 9/2011 | Eichenberger et al. |

OTHER PUBLICATIONS

Blume, William et al., "Nonlinear and Symbolic Data Dependence Testing", IEEE Transactions on Parallel and Distributed Systems, vol. 9, Issue 12, 1998, 6 pages.

Chen, Ding-Kai et al., "An Efficient Algorithm for the Run-Time Parallelization of Doacross Loops", In Proceedings of Supercomputing, 1994, pp. 1-32.

Chen, Lei et al., "Dynamic Data Dependence Tracking and its Application to Branch Prediction", IEEE, Proceedings of the Ninth International Symposium on High-Performance Computer Architecture (HPCA-9'03), 2002, 12 pages.

Krothapalli, V.P. et al., "An Approach to Synchronization for Parallel Computing", ACM, Jun. 1988, pp. 573-581.

Leung, Shun-Tak et al., "Improving the Performance of Runtime Parallelization", 4th ACM PPOPP, May 1993, pp. 83-91.

Midkiff, Samuel P. et al., "Compiler Algorithms for Synchronization", IEEE Transactions on Computers, vol. C-36, No. 12, Dec. 1987, pp. 1485-1495.

Polychronopoulos, Constantine D. , "Compiler Optimizations for Enhancing Parallelism and Their Impact on Architecture Design", IEEE Transactions on Computers, vol. 37, No. 8, Aug. 1988, pp. 991-1004.

Rauchwerger, Lawrence et al., "A Scalable Method for Run-Time Loop Parallelization", IJPP, 26(6), Jul. 1995, 21 pages.

Rauchwerger, Lawrence et al., "Run-Time Methods for Parallelizing Partially Parallel Loops", International Conference on Supercomputing, 1995, 10 pages.

Saltz, Joel H. et al., "Run-time parallelization and scheduling of loops", NASA Contractor Report 181763, Dec. 1988, 35 pages.

Saltz, Joel H. et al., "The Preprocessed Doacross Loop", NASA Contractor Report 182056, ICASE Interim Report 11, May 1990, 18 pages.

Zhu, C et al., "A scheme to enforce data dependence on large multiprocessor systems", IEEE Transactions Software Engineering, 13(6), Jun. 1987, pp. 726-739, Abstract only, 1 page.

Office Action mailed Mar. 19, 2013 for U.S. Appl. No. 12/717,985, 19 pages.

\* cited by examiner

```
ic = next[i]; //ic=i
ncfaces = Geom.nfpc[ic]; //=3 for (icface=1;icface<=ncfaces;icface++) {
    afpm[icface] = omega[1]*Geom.A_surf[1][icface][1][ic] + omega[2]*Geom.A_surf[2][icface][1][ic] +
                   omega[3]*Geom.A_surf[3][icface][1][ic];
    aezm[icface] = omega[1]*Geom.A_surf[1][icface][2][ic] + omega[2]*Geom.A_surf[2][icface][2][ic] +
                   omega[3]*Geom.A_surf[3][icface][2][ic];
406─ if ( afpm[icface] < 0.0 ){
        ...=psifp[1..NPART][icface][ic];  ─402
    }
408─ if (aezm[icface] < 0.0 ) {
        ...=curez[1..NPART][icface][ic];  ─404
    }else{
        ifp = icface;
        for( k=1; k<=ncfaces-2; k++){
            ifp = ifp%ncfaces + 1;
            if ( afpm[ifp] < 0.0 ) {
                ...=psifp[1...NPART][ifp][ic];
            }
        }
414─   curez[1..NPART][Geom.Connect[4][icface][ic]][Geom.Connect[3][icface][ic]] =...
    }
    if (afpm[icface] > 0.0 && Geom.Connect[1][icface][ic]=0)
        ┌psifp[1..NPART][Geom.Connect[2][icface][ic]][Geom.Connect[1][icface][ic]] =...
}  }
    412
```

FIG. 4

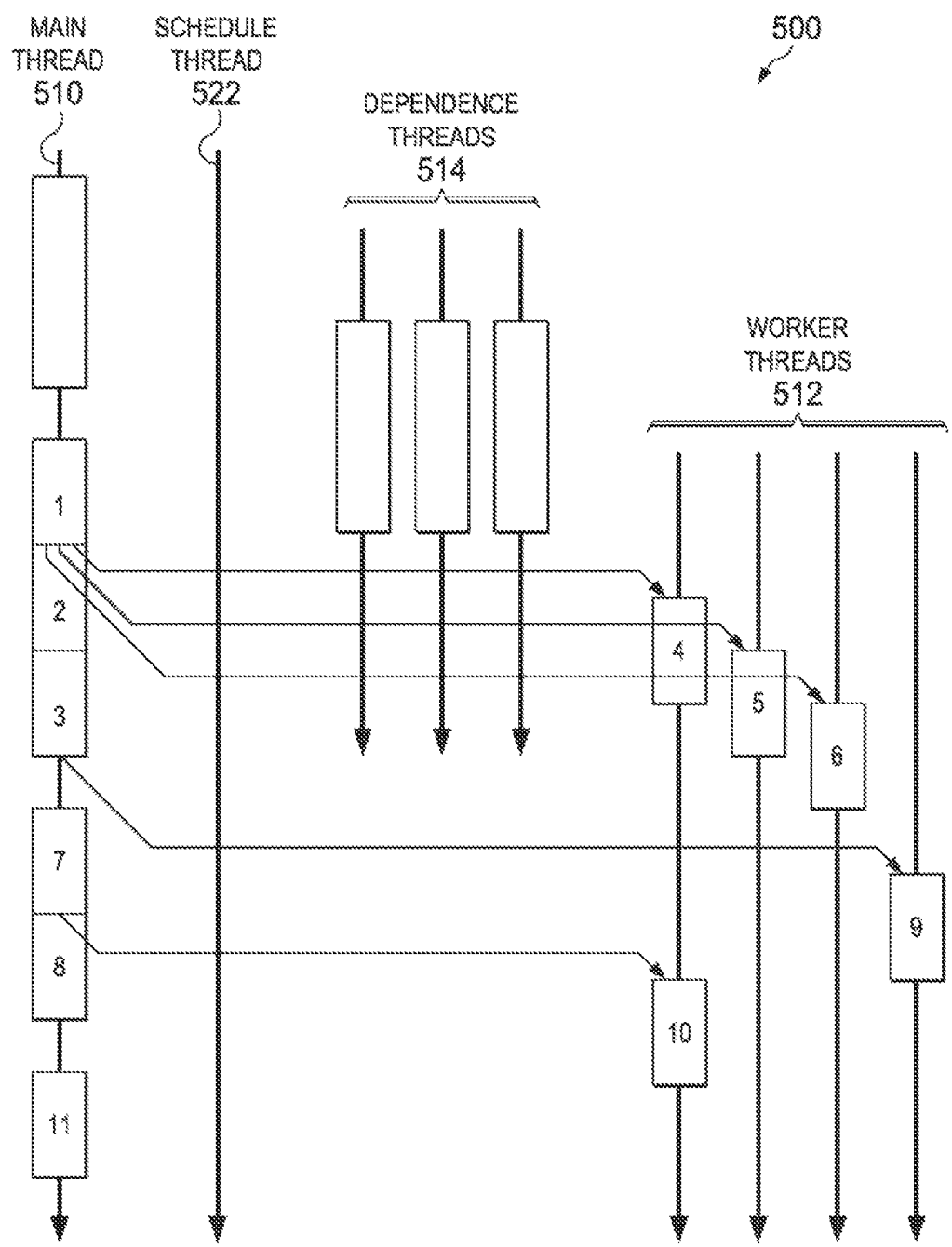

```
LinkedList dependenceCheckingFunction(int ) {
    LinkedList l=new LinkedList();
    ic = next(i); //ic--
    ncfaces = Geom.nfx[ic]; //=3 for (icface=1;icface<=ncfaces;icface++) {
        afpm[icface] = omega[1]*Geom.A_surf[1][icface][1][ic] + omega[2]*Geom.A_surf[2][icface][1][ic] +
                       omega[3]*Geom.A_surf[3][icface][1][ic];
        aezm[icface] = omega[1]*Geom.A_surf[1][icface][2][ic] + omega[2]*Geom.A_surf[2][icface][2][ic] +
                       omega[3]*Geom.A_surf[3][icface][2][ic];
        if ( afpm[icface] < 0.0 ){
            l.add(new Dept(psifp,ic,USE)); //...=psifp[1..NPART][icface][ic];   ~702
        }
        if (aezm[icface] < 0.0 ) {
            l.add(new Dept(curez,ic,USE)); //...=curez[1..NPART][icface][ic];   ~704
        }else{
            ifp = icface;
            for( k=1; k<=ncfaces-2; k++){
                ifp = ifp%ncfaces + 1;
                if ( afpm[ifp] < 0.0 ) {
                    l.add(new Dept(psifp,ic,USE)); //...=psifp[1..NPART][ifp][ic];   ~706
                }
            }
        }
        l.add(new Dept(curez, Geom.Connect[3][icface][ic],DEF)); //curez[1..NPART][Geom.Connect[4][icface][ic]][Geom.Connect[3][icface][ic]] =... ~708
        if (afpm[icface] > 0.0 && Geom.Connect[1][icface][ic]!=0)
            l.add(new Dept(psifp, Geom.Connect[1][icface][ic],DEF)); //psifp[1..NPART][Geom.Connect[2][icface][ic]][Geom.Connect[1][icface][ic]] =... ~710
    }
    Return l;
}
```

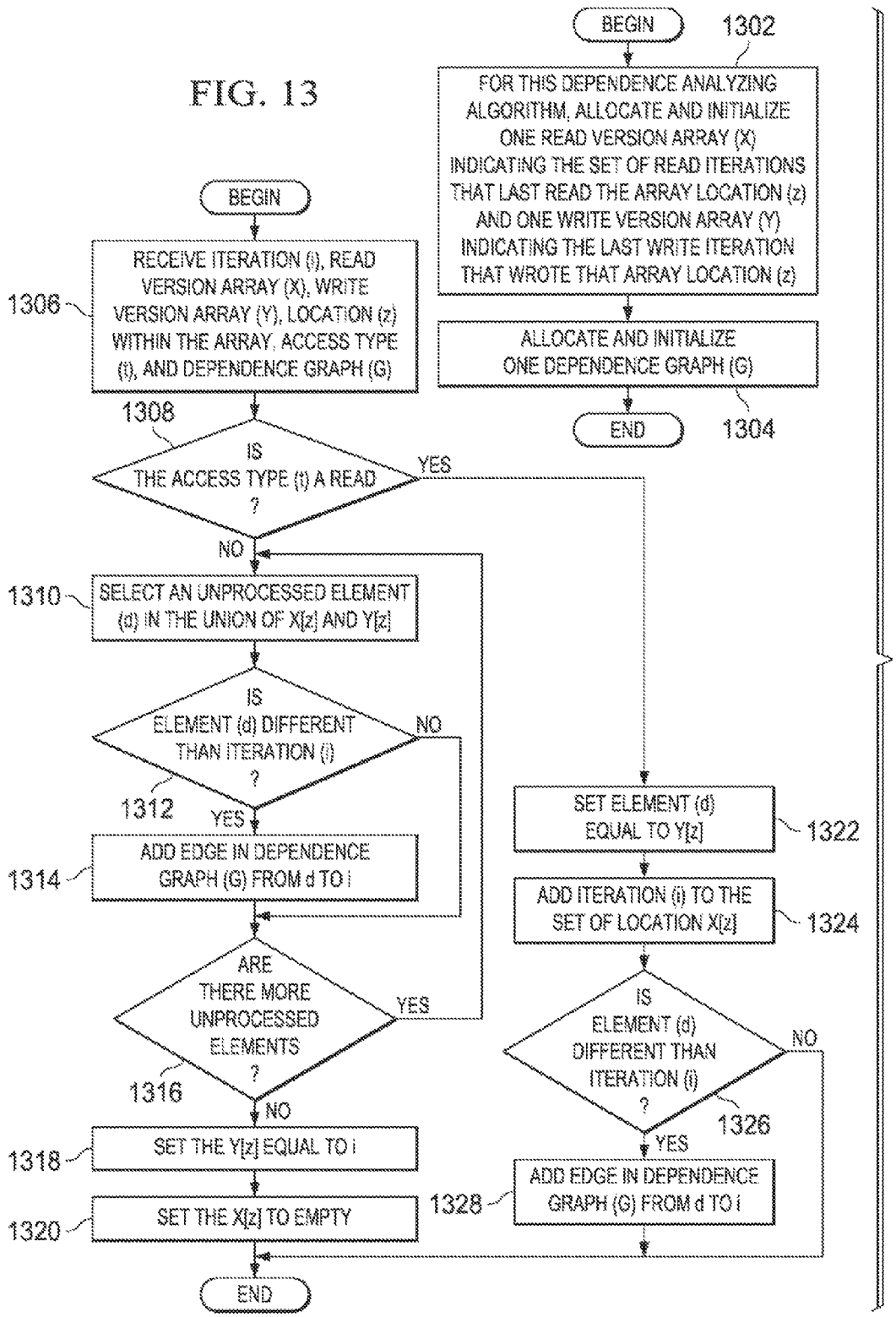

RUNTIME DEPENDENCE-AWARE SCHEDULING USING ASSIST THREAD

This application is a continuation of application Ser. No. 12/435,809, filed May 5, 2009, status allowed.

BACKGROUND OF THE INVENTION

1. Field of the Invention

The present application relates generally to an improved data processing apparatus and method and more specifically to an apparatus and method for a runtime dependence-aware scheduling of independent iterations so that the independent iterations are scheduled and executed ahead of time in parallel with other iterations.

2. Background of the Invention

Typically, loops within executable code of an application take most of the execution time of the application; therefore, in order to improve performance of applications, parallelization of loops is very important. Current parallelizing compiler infrastructure analyzes code at compilation time to identify loops that are amenable to parallelization. Thus, all iterations within the code should be independent, i.e. any two iterations do not access the same data and one of the accesses is a write. Once the independent iterations are determined, the compiler then outlines the loop body as a function. At runtime, symmetric multiprocessing (SMP) runtime controls how iterations are distributed to multiple threads that are running simultaneously, such that the execution of the loop is parallelized.

A major difficulty for loop parallelization is the uncertainty of memory accesses across iterations, which are often impossible to determine at compilation time. Several obstacles may prevent the compiler from properly deriving the dependences, such as:

1. Pointer accesses that may not be determined statically,
2. Uncertain control flow that may bypass some memory accesses,
3. Array elements indexed by complicated computations, or
4. Array elements indexed by other arrays (indirect array accesses).

Thread Level Speculation (TLS) may be used to deal with unknown dependences. Using hardware to detect conflicting memory accesses across iterations relieves the compiler from analyzing the dependences. However, once a conflict is detected, the loop must be rolled back in order to allow the earlier thread to finish. Rollback is typically expensive, especially for loops with a significant number of conflicting memory accesses. Besides, TLS relies heavily on hardware support that may increase the latency on other data paths. Currently, there is no real hardware support by any chip manufactures. Most importantly, the compiler may normally provide valuable information regarding the independence of some iterations. TLS tends to discard all such information by relying completely on the hardware to detect dependences.

Some early research proposed inspectors that perform dependence computation before the loop is executed. Inspectors execute in front of the main loop, and, thus, an upfront cost of extra execution time is paid whether the loop is parallelizable or not. Also, the inspector only checks if the loop is completely parallelizable or not. Oftentimes, a loop may contain iterations that are partially parallelizable, i.e. a subset of iterations that can be parallelized may be identified. The inspector approach is not able to capture partial parallelization. In addition, with processor chips that comprise multiple processing cores, the number of cores may be larger than the amount of parallelism. While having multiple cores provides a great opportunity to speedup dependence computation, inspectors do not take advantage of this capability.

BRIEF SUMMARY OF THE INVENTION

In one illustrative embodiment, a method, in a data processing system, is provided for a runtime dependence-aware scheduling of dependent iterations. The illustrative embodiment receives computer executable code that contains a plurality of iterations. The illustrative embodiment performs computation for one or more iterations of the computer executable code by a main thread. The illustrative embodiment determines dependence information for a plurality of memory accesses within the computer executable code using modified executable code using a set of dependence threads in the data processing system. Using the dependence information, the illustrative embodiment determines if a subset of a set of uncompleted iterations in the plurality of iterations is capable of being executed ahead-of-time by the one or more available threads in the data processing system. Responsive to a determination that the subset of the set of uncompleted iterations in the plurality of iterations is capable of being executed ahead-of-time, the illustrative embodiment signals the main thread to skip the subset of the set of uncompleted iterations. The illustrative embodiment then signals the set of assist threads in the data processing system to execute the subset of the set of uncompleted iterations. In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts an example of code in a loop body in accordance with an illustrative embodiment;

FIGS. 5A-5C depict a functional block diagram of a dependence-aware scheduling mechanism in accordance with an illustrative embodiment;

FIG. 7 depicts an example of building a dependence checking code for the Unstructured Mesh of Transport (UMT) benchmark in accordance with an illustrative embodiment;

FIG. 13 depicts a third example of a dependence analyzing algorithm that may be executed by a dependence computation module in accordance with an illustrative embodiment;

DETAILED DESCRIPTION OF THE INVENTION

Figure 1:
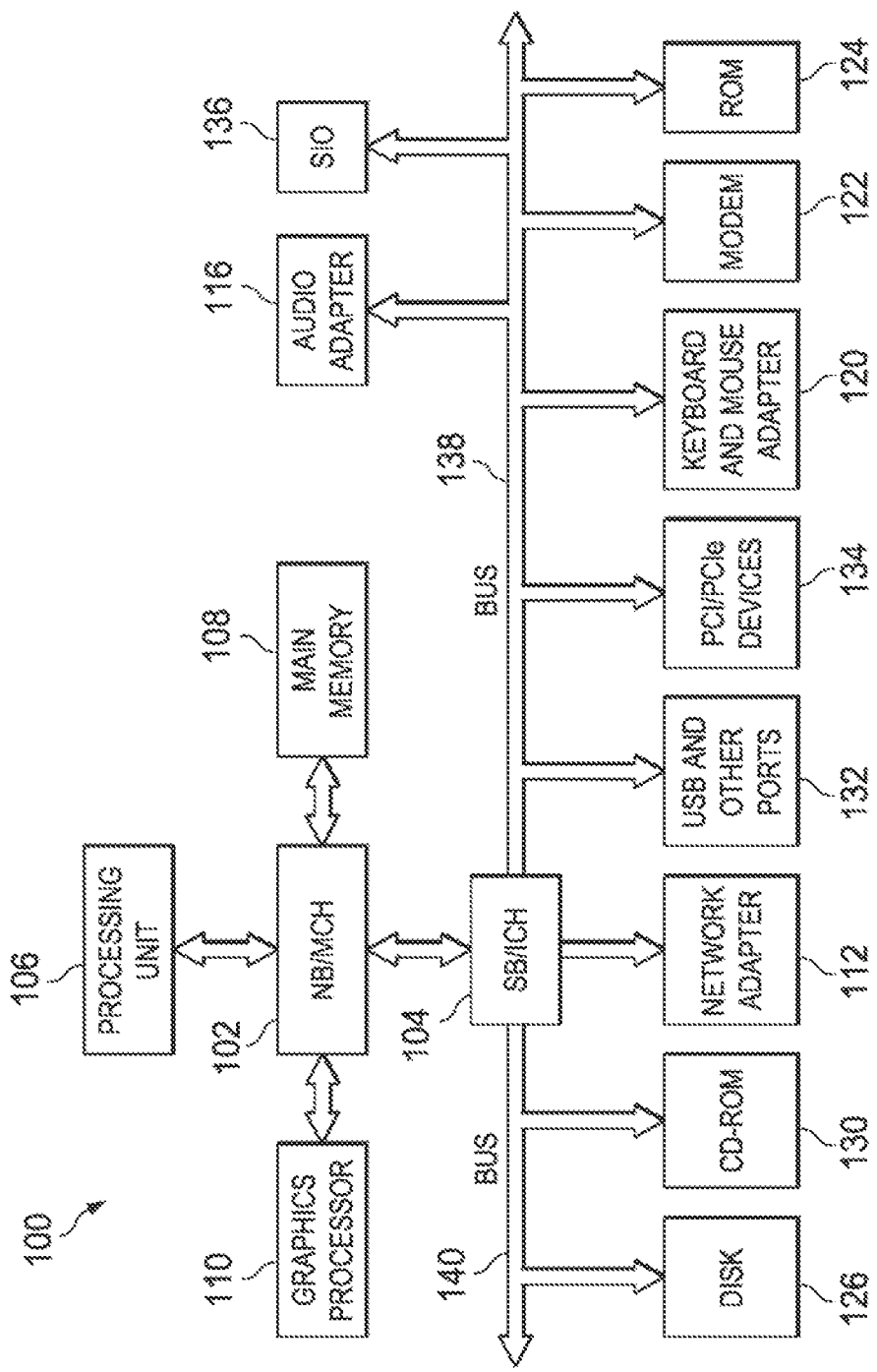
FIG. 1 depicts an exemplary diagram of a data processing environment in which embodiments of the present invention may be implemented.

The illustrative embodiments provide a mechanism for a runtime dependence-aware scheduling of independent iterations so that the independent iterations are scheduled and executed ahead of time in parallel with other iterations. Within the illustrative embodiments, threads other than a main thread or threads on cores on a multi-core chip are used to compute dependences within a loop as the loop executes. The other threads feed this information to a scheduler thread that is able to parallelize some of the iterations across other threads operating simultaneously. Computing dependences within a loop as the loop executes allows loops that are otherwise not parallelizable to be parallelized.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart, illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
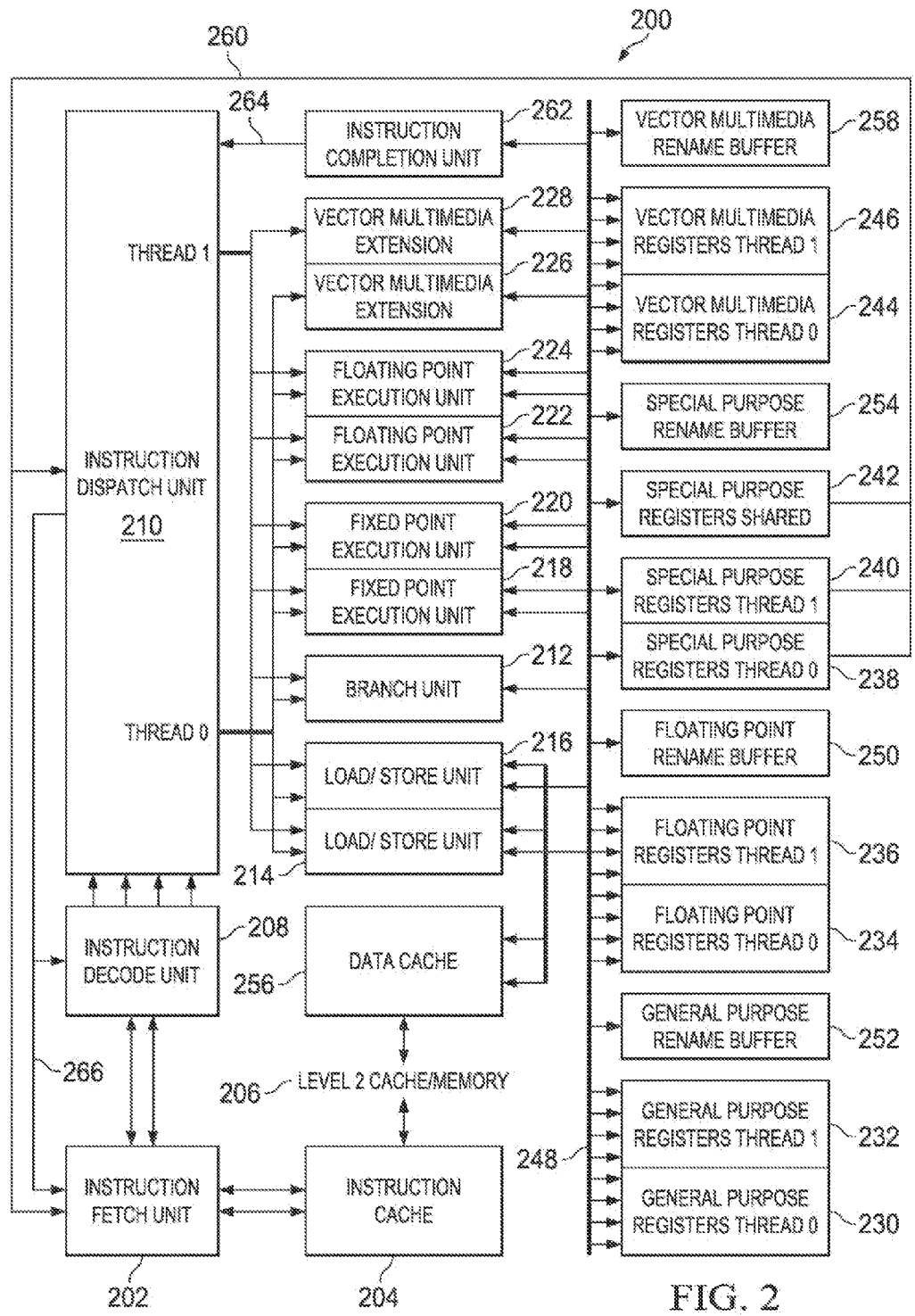
FIG. 2 depicts an exemplary block diagram of a conventional dual threaded processor design showing functional units and registers in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a runtime dependence-aware scheduling mechanism that schedules and executes independent iterations ahead of time in parallel with other iterations, this is only an example and is not intended to state or imply any limitation with, regard to the features of the present invention. To the contrary, the illustrative embodiments are intended to include distributed data processing environments and embodiments in which independent iterations are scheduled at runtime and executed ahead of time in parallel with other iterations.

With reference now to the figures and in particular with reference to FIGS. 1-2, example diagrams of data processing environments are provided in which illustrative embodiments of the present invention may he implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary diagram of a data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (S1O) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United. States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

The hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

Referring to FIG. 2, an exemplary block diagram of a conventional dual threaded processor design showing functional units and registers is depicted in which aspects of the illustrative embodiments may be implemented. Processor 200 may be implemented as processing unit 106 in FIG. 1 in these illustrative examples. Processor 200 comprises a single integrated circuit superscalar microprocessor with dual-thread simultaneous multi-threading (SMT). Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction dispatch unit (IDU) 210. IDU 210 selectively groups decoded instructions from instruction decode unit 208 for each thread, and outputs or issues a. group of instructions for each thread to execution units 212, 214, 216, 218, 220, 222, 224, 226, and 228 of the processor.

In an illustrative embodiment, the execution units of the processor may include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored, once an instruction has completed execution. ARFs 230, 232, 234, 236, 238, 240, 242, 244, and 246 may store data separately for each of the two threads and by the type of instruction, namely general purpose registers (GPR) 230 and 232, floating-point registers (FPR) 234 and 236, special purpose registers (SPR) 238 and 240 and vector registers (VR) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 248.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is, data that has been generated during instruction execution where the instruction has not completed execution. FPUA 222. and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244' and 246 when the instruction has passed the point of flushing in the pipeline.

Data cache 256 may also have associated with it a non-cacheable unit (not shown) which accepts data from the processor and writes it directly to level 2 cache/memory 206, thus bypassing the coherency protocols required for storage to cache.

In response to the instructions input from instruction cache 204 and decoded by instruction decode unit 208, IDU 210 selectively dispatches the instructions to execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed-point mathematical operations on register source operands, such as addition, subtraction, ANDing, ORing and XORing. FPUA 222 and FPUB 224 execute floating-point mathematical operations on register source operands, such as floating-point multiplication and division. LSUA 214 and LSUB 216 execute load and store instructions, which move operand data between data cache 256 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

IDU 210 groups together instructions that are decoded by instruction decode unit 208 to be executed at the same time, depending on the mix of decoded instructions and available execution units 212, 214, 216, 218, 220, 222, 224, 226, and 228 to perform the required operation for each instruction. For example, because there are only two load/store units 214 and 216, a maximum of two load/store type instructions may be grouped together. In an illustrative embodiment, up to seven instructions may be grouped together (two fixed-point arithmetic, two load/store, two floating-point arithmetic (FPU) or two vector multimedia extension (VMX), and one branch), and up to five instructions may belong to the same thread. IDU 210 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next slice of processor time. Threads are scheduled in a round-robin fashion at each priority level, and only when there are no executable threads at a higher level does scheduling of threads at a lower level take place.

However, IDU 210 dispatches either FPU instructions 222 and 224 or VMX instructions 226 and 228 in the same group with FXU instructions 218 and 220. That is, IDU 210 does not dispatch. FPU instructions 222 and 224 and VMX instructions 226 and 228 in the same group. Program states, such as an instruction pointer, stack pointer, or processor status word, stored in SPRs 238 and 240 indicate thread priority 260 to IDU 210.

Instruction completion unit 262 monitors internal bus structure 248 to determine when instructions executing in execution units 212, 214, 216, 218, 220, 222, 224, 226, and 228 are finished writing their operand results to rename buffers 250, 252, 254, or 258. Instructions executed by branch unit 212, FXUA 218, FXUB 220, LSUA 214, and LSUB 216 require the same number of cycles to execute, while: instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228 and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 262 monitors for the completion of instructions, and sends control information 264 to IDU 210 to notify IDU 210 that more groups of instructions can be dispatched to execution units 212, 214, 216, 218, 220, 222, 224, 226, and 228. IDU 210 sends dispatch signal 266, which serves as a throttle to bring more instructions down the pipeline to the dispatch unit, to IFU 202 and instruction decode unit 208 to indicate that it is ready to receive more decoded instructions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 3:
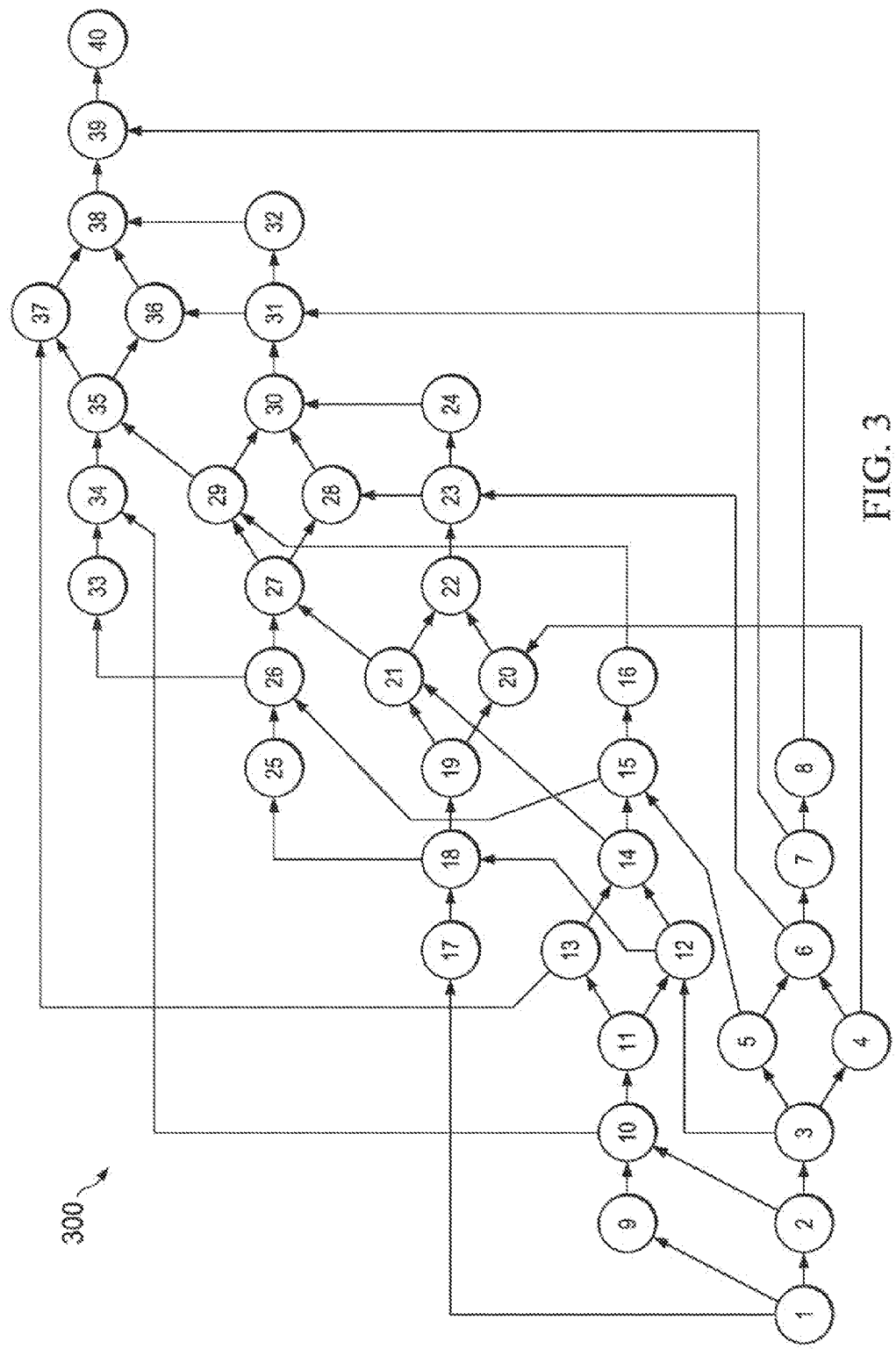
FIG. 3 depicts an example of such a dependence Directed Acyclic Graph (DAG) of an Unstructured Mesh of Transport code (UMT) benchmark for forty iterations in accordance with an illustrative embodiment.

Again, the illustrative embodiments provide a mechanism for a runtime dependence-aware scheduling of independent iterations so that the independent iterations are scheduled and executed ahead of time in parallel with other iterations. A dependence Directed Acyclic Graph (DAG) describes dependent relationships among iterations. FIG. 3 depicts an example of such a dependence Directed Acyclic Graph (DAG) of an Unstructured Mesh of Transport code (UMT) benchmark for forty iterations in accordance with an illustrative embodiment. In dependence DAG 300, dependences are considered between iterations; however, the illustrative embodiments are not limited to only these types of iterations. That is, the illustrative embodiment may also arbitrarily group two or more consecutive iterations and consider the group as a unit to detect dependences from. Also, if the loop body is large, the illustrative embodiments may also split a single loop iteration into two or more group of consecutive instructions and then consider each group as a unit to detect dependences from. Furthermore, there may be arbitrary control flow (including nested loops) within a unit used to detect dependences from.

Dependence DAG 300 may be built statically through compiler analyses. However, due to the uncertainty of memory accesses, statically built dependence DAGs are often too conservative. In other words, statically built dependence DAGs may include many unnecessary edges. On the other hand, at runtime all memory accesses are resolved and a true picture is provided regarding which iterations access the same data unit. Using such dependence information, dependence DAG 300 may be built. To reduce the size of dependence DAG 300, indirect dependence edges may be removed. For example, if iteration 10 is dependent on iteration 5 and iteration 1, while iteration 5's dependency on iteration 1 is already on the DAG, the edge from iteration 10 being dependent on iteration 1 may be considered as not needed. On the other hand, the illustrative embodiments are not limited by any hardware buffer size, as the illustrative embodiments use programmable threads to determine dependences between iterations. In addition, determining dependences among iterations (a unit of arbitrary many instructions) may be more beneficial when looking at thread-level parallelism because instructions may be too small a unit of work, whereas iterations encompass larger units of work that are better suited for thread level parallelism.

Dependence DAG 300 is built from a benchmark program that simulates interactions among elements in a 2D or 3D space. Dependence DAG 300 illustrates that, for example, iterations 2, 9, and 17 are dependent on iteration 1. However, once iteration 1 is complete, iterations 2, 9 and 17 may be executed independently of each other. Dependence DAG 300 may be constructed based on code in a loop body:

FIG. 4 depicts an example of code in a loop body in accordance with an illustrative embodiment. Code 400 mainly contains accesses to two arrays, array psifp and array curez, that may cause loop carried dependences. One of the possible dependences is between statement 414 where array curez is defined and statement 404 where array curez is potentially used. Another of the possible dependence is between statement 412 where array psifp is potentially defined and statement 402 where array psifp is used. Accesses to array psifp and array curez may be predicated by the values of two local arrays: afpm 406 and aezm 408. In code 400, both read and write accesses are present. Since values of arrays afpm 406 and aezm 408 are unknown at compilation time, there is no way for the compiler to compute the memory access pattern. Therefore, the compiler gives up parallelizing the loop.

As mentioned earlier, complicated access patterns and dependences are very difficult to derive using static analysis. As is illustrated in dependence DAG 300 of FIG. 3, opportunities for parallelizing part of the iterations appear to be sporadic. Often, only a small number of iterations exist between a dependent iteration and the iteration on which it depends. However, if some of these opportunities can be captured, the potential speedup may be quite promising.

Given the need to capture small parallelization opportunities at runtime, the illustrative embodiments provide a dynamic optimization which may be referred to as dependence-aware scheduling using assist thread. The illustrative embodiments identify the dependence distance on the DAG which is good enough for independent iterations to be scheduled and executed ahead of time in parallel with other iterations.

Figure 5A:
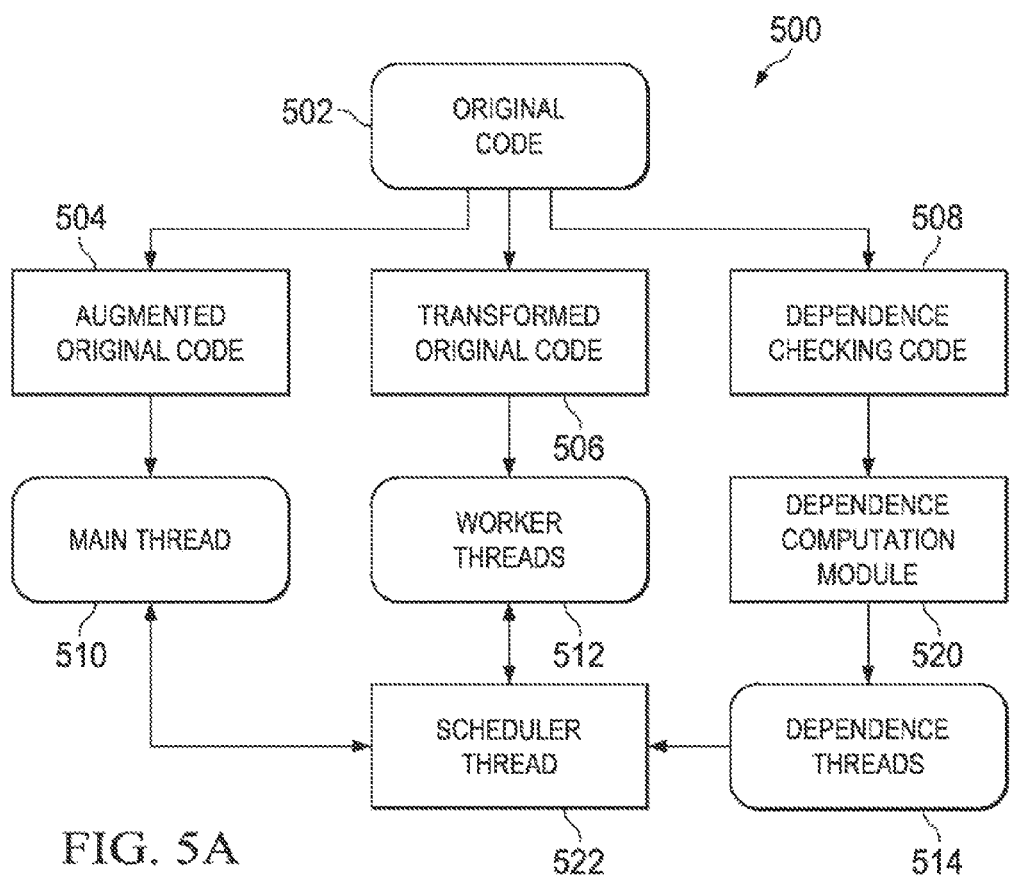
Figure 5C:
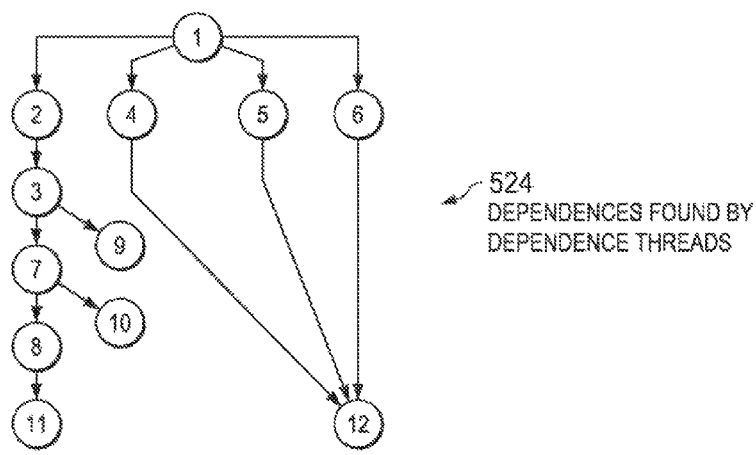

FIGS. 5A-5C depict a dependence-aware scheduling mechanism in accordance with an illustrative embodiment. Dependence-aware scheduling 500 is performed in a multithreaded execution environment. With dependence-aware scheduling 500, a compiler processes original code 502 to produce augmented original code 504, transformed original code 506, and dependence checking code 508. Original code 502 is what is originally provided to be compiled and run without dependence-aware scheduling. Original code 502 should produce the desired results. Augmented original code 504 is executed on main thread 510 of the multithreaded execution environment. Augmented original code 504 is original code 502 augmented with control and communication code such that the scheduler thread can control the main thread. Transformed original code 506 runs on worker threads 512. Transformed original code 506 is essentially a subset of iterations that are able to communicate with the scheduler thread. Dependence checking code 508 is extracted for each particular loop body as a dependence slice that only involves cross-iteration memory accesses. Dependence checking code 508 is used to analyze dependences by the dependence computation module 520 on dependence threads 514. The generation of the dependence checking follows static slicing techniques. Since the illustrative embodiments are only interested in memory accesses that may cause loop-carried dependences, such instructions are identified in original code 502. Next, dependence computation module 520 executes dependence checking code 508 on dependence threads 514 to identify all instructions that a memory access depends on in each dependence slice. This includes both control and data dependences. This process continues recursively until all instructions that the memory access depends on, directly or indirectly, are part of the dependence slice.

Figure 6:
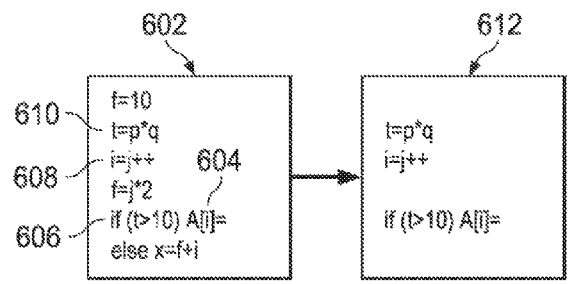
FIG. 6 depicts an example of determining a dependence slice from the loop body of code in accordance with an illustrative embodiment.

FIG. 6 depicts an example of determining a dependence slice from the loop body of code in accordance with an illustrative embodiment. In loop body 602, memory access A[i] 604 is first identified as the memory access that could cause loop-carried dependences. A[i] 604 is control-dependent on conditional branch 606; therefore, conditional branch 606 is part of the slice. Similarly, the computation of i 608 and t 610 must be in the dependence slice as well, since they define values that are used by instructions already present in the slice. Eventually, all irrelevant instructions are removed, leaving only the dependence slice 612.

Typically, a loop contains multiple memory accesses that could lead to loop-carried dependences. The dependence slice with regard to those memory accesses may be merged together to form the complete dependence slice. Eventually, a dependence checking code is generated. The dependence checking code takes a parameter, i.e. the iteration number, and returns a list of accessed memory addresses as well as the type of the access (read or write).

FIG. 7 depicts an example of building a dependence checking code for the Unstructured Mesh of Transport (UMT) benchmark in accordance with an illustrative embodiment. To build a dependence slice as described in FIG. 6, all memory accesses that may cause dependences are stored in a linked list, which will be returned by the function. Therefore, in UMT benchmark 700 such memory accesses are replaced by statements 702, 704, 706, 708, and 710 that add new elements to the linked list.

Returning to FIGS. 5A-5C, main thread 510 executes augmented original code 504. Main thread 510 executes each loop in augmented original code 504 sequentially and checks with scheduler thread 522 after the execution of each iteration in the loop whether the next iteration should be executed or skipped. During early stages of the execution of a particular loop on main thread 510, scheduler thread 522 executes dependence checking code on dependence threads 514 to run computations to identify dependence distances within the loop so that iterations may be executed in parallel.

Because computing dependences at runtime is a net overhead, dependence computation module 520 attempts to perform computations on dependence threads 514 as cheaply as possible and at a faster rate than main thread 510, otherwise the information will be too late to help speedup main thread 510. Dependence computation module 520 scales the computations to one or more threads, and possibly to as many threads that are available in the data processing system, in order to shorten the total execution time.

To compute dependence relationships, dependence computation module 520 executes dependence checking code on dependence threads 514. In one embodiment, dependence threads 514 allocate a temporary array for each array accessed in the loop body that might involve loop-carried dependences. These temporary arrays may be referred to as version arrays, which records which iterations have accessed the particular element. For a write operation to a particular array, dependence computation module 520 only tracks the last write operation because the last write operation overwrites or kills all previous writes. For a read operation of a particular array, dependence computation module 520 maintains a list of iterations that read the data until a write operation to the particular array occurs. At this point dependence computation module 520 removes all reads from the version array of the particular array. In this manner, all three types of dependences: flow dependence, anti dependence, and output dependence are taken care of. Flow dependence is a read-after-write dependence, anti dependence is a write-after-read dependence, and output dependence is a write-after-write dependence. In general, a dependence is two or more statements addressing the same memory location.

In one embodiment, dependence computation module 520 calls the dependence checking code of all iterations sequentially. If an iteration writes to a particular array, dependence computation module 520 marks the iteration in the version array of that particular array. If a later iteration reads from the same element, dependence computation module 520 establishes a dependence relationship between the two iterations. Similarly, write-after-read (anti), write-after-write (output) dependences are also detected. There may be multiple arrays being accesses by the loop; therefore, the identified dependence relationships are unions of dependences by all arrays. In another embodiment, the dependences are computed in parallel by two or more threads. In this embodiment, each thread participating in the dependence computation evaluates the dependence checking code assigned to it in a sequential manner. To be conservative, the illustrative embodiments consider iterations assigned to distinct dependence-computing threads to be dependent.

Figure 8:
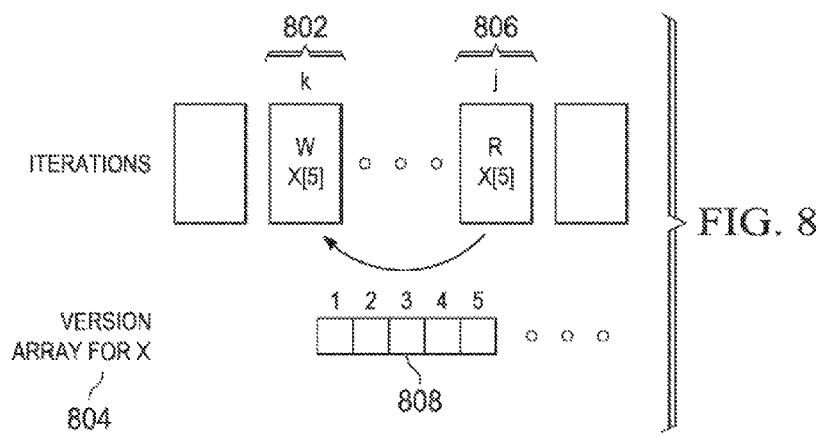
FIG. 8 illustrates an example of deriving a dependence using the dependence checking code in accordance with an illustrative embodiment.

FIG. 8 illustrates an example of deriving a dependence using the dependence checking code in accordance with an illustrative embodiment. In this example, iteration k 802 first writes data to array X's fifth element then iteration j 806 reads the data from array X's fifth element. By identifying the order and type of memory accesses performed by iterations 802 and 806, a dependence computation module constructs a dependence edge from iteration j 806 to iteration k 802. As will be detailed later, a version array for array X 804 is created and the fifth element of the version array 808 is marked accordingly to identify this dependence.

Returning to FIGS. 5A-5C, to further reduce space overhead, the illustrative embodiments determine how much room is available to move an iteration ahead of time. That is, dependence computation module 520 identifies only the closest iteration that the current iteration depends on. Therefore, the version array can only record the iteration number of the last read or write access. Also, dependence computation module 520 keeps a dependence distance for each iteration, which is the nearest iteration it depends on. This succinct representation also helps the scheduler to quickly schedule iterations. Dependence computation module 520 then transfers the identified dependence distances to scheduler thread 522. An example of dependences that may be identified by dependence computation module 520 is shown in Directed Acyclic Graph (DAG) 524 in FIG. 5C.

As mentioned previously, during early stages of the execution of a particular loop on main thread 510, scheduler thread 522 requests dependence computation module 520 executing dependence checking code on dependence threads 514 to run computations to identify dependence distances within the loop so that iterations may be executed in parallel. During the time when the dependence computation module 520 is computing the dependence distances, scheduler thread 522 waits, at runtime, for the dependence computation to finish. Once the scheduler thread 522 receives the dependence distance for each iteration, scheduler thread 522 determines which iterations may have already been executed on main thread 510, because main thread 510 executes iterations in parallel to the computation of dependences by dependence computation module 520. By the time dependence computation module 520 finishes dependence computation, main thread 510 has already executed for a while. If one or more iterations have been executed by main thread 510, scheduler thread 522 simply ignores those early executed iterations. Scheduler thread 522 then schedules those incomplete iterations that have enough room for ahead-of-time execution and signals worker threads 512 to execute and for main thread 510 to skip the particular iterations.

As is shown in FIG. 5B, dependence computation module 520 has identified that iterations 4, 5, 6, 9, and 10 are independent and may be executed on one or more worker threads 512. Scheduler thread 522 then schedules worker threads 512 to execute iterations 4, 5, 6, 9, and 10, and schedules main thread 510 to skip iterations 4, 5, 6, 9, and 10. The synchronization may be performed through a bit-vector, which uses a bit to represent each iteration, through other inter-thread, communication mechanisms, or the like. A lock may be needed to ensure atomic operations to the bit-vector, if the bit-vector is implemented. Finally, as mentioned earlier, the scheduler may be a standalone thread that synchronizes itself with other threads.

In dependence-aware scheduling mechanism 500 dependence threads 514 may start arbitrarily early as possible in a given application, there may be one or more of dependence threads 514, dependence threads 514 and worker threads 512 may or may not be the same, there may be different numbers of dependence threads 514 than worker threads 512, and scheduler thread 522 may be present or worker threads 512/ main thread 510 may be self-scheduling. Also, if it can be established that, for a given set of iterations, the dependences have not changed from a prior execution of the same set of iterations, then it is possible to reuse the previously computed dependences and skip the computations of the dependences entirely. Sometimes it is possible to detect in a given application that dependences have not changed by determining that key data structures have not been modified. In such a case, it is sufficient to determine that such key data structures have not changed to ensure that the last computed dependence graph is still valid. Using this scheme, an application that changes key data-structures only once per phase (e.g. every 100 time that the set of iterations is computed) will incur the dependence computing overhead only once per phase.

There are many possible embodiments for scheduler thread 522. Scheduler thread 522 may be implemented as a library, which is called by the main thread and dependence computation threads. Or, scheduler thread 522 may be run on a separate thread and communicates with other threads. Running on a separate thread may reduce the execution overhead by utilizing extra core resources. Scheduler thread 522 takes dependency information after calculation through an inter-thread communication mechanism and decides which iterations can be scheduled to be executed earlier. Scheduler thread 522 also informs the main thread to skip some of the iterations that have already been scheduled earlier through inter-thread communication.

There may be no guarantee that dependence calculation will reveal actual opportunities for scheduler thread 522 to schedule some of the iterations early. If the dependences are very tight, for example, each iteration depends on the previous iteration, the loop may only be executed sequentially. However, by calculating the dependences, an upfront cost of computation has already been paid, as well as possible interference with the main thread. Therefore, it is important that dependence computation should interfere with the main thread as little as possible.

Thus, the illustrative embodiment provide for a dependence-aware scheduling of independent iterations so that the independent iterations are scheduled and executed ahead of time in parallel with other iterations. Unused threads or threads on cores on a multi-core chip are used to compute dependences within a loop as the loop executes. The threads or threads on cores feed this information to a scheduler that is able to parallelize some of the iterations across other threads operating simultaneously. Computing dependences within a loop as the loop executes allows loops that are otherwise not parallelizable to be parallelized.

Figures 9, 10:
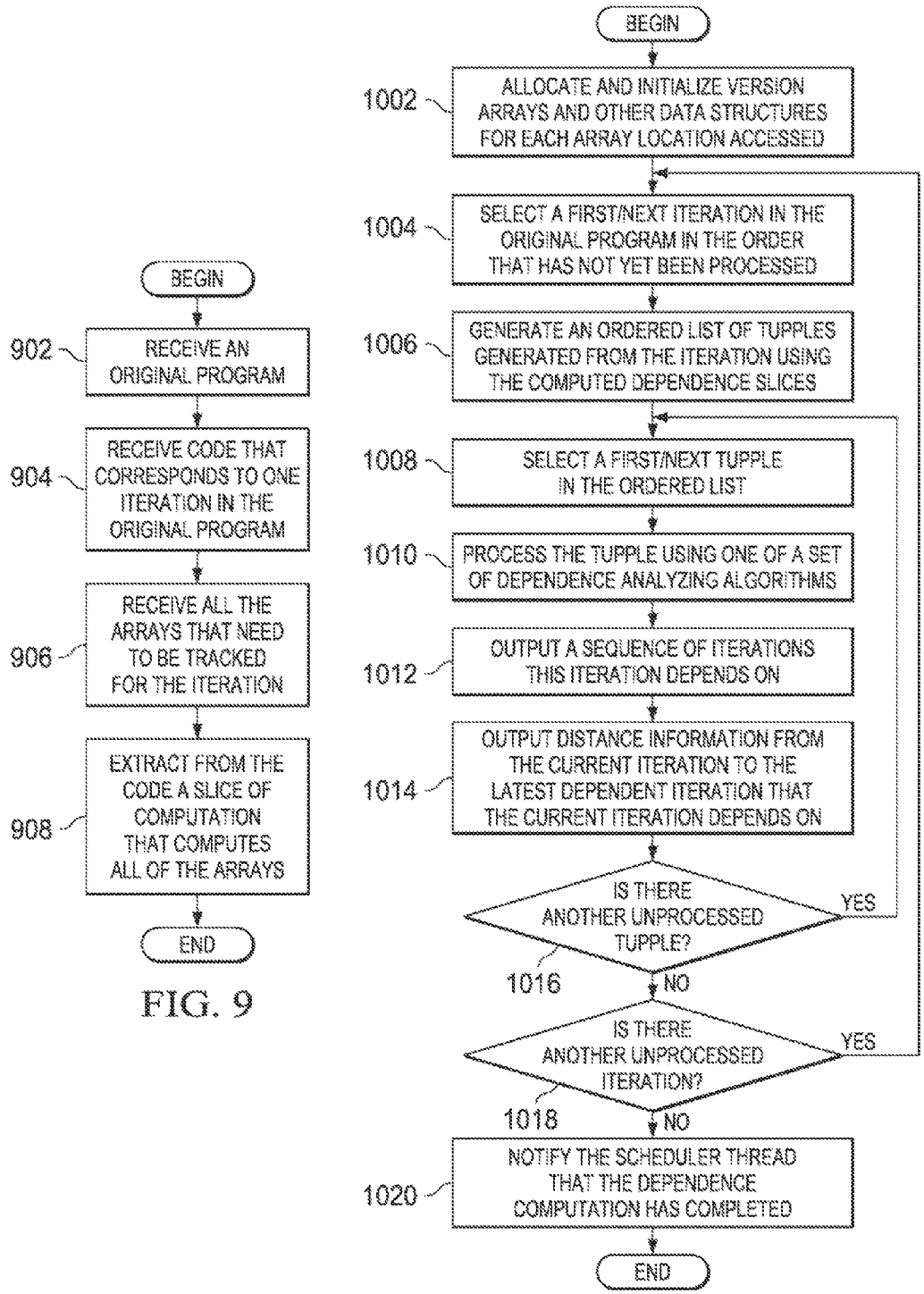
FIG. 9 depicts an example of the operation performed by a compiler of a dependence-aware scheduling mechanism in accordance with an illustrative embodiment.
FIG. 10 depicts an example of the operation performed by a dependence computation module of a dependence-aware scheduling mechanism at runtime in accordance with an illustrative embodiment.

FIG. 9 depicts an example of the operation performed by a compiler of a dependence-aware scheduling mechanism in accordance with an illustrative embodiment. As the operation begins, a compiler receives an original program that is to be executed (step 902). The compiler also receives code that corresponds to one loop iteration in the original program (step 904). The illustrative embodiments note that the referred to "code that corresponds to one loop iteration" may be a unit of work that is to be executed atomically by the main thread or the worker threads. The term "loop iteration" simply indicates that, often, a loop iteration in original code 502 is a meaningful unit of work. However, the term "loop iteration" may also refer to multiple loop iterations in the code or subset of a single loop iteration in the code as a unit of work.

The compiler also receives all the arrays that need to be tracked for the iteration (step 906). The compiler then extracts from the code a slice of computation that computes all of the arrays for the arrays that need to be tracked for the iteration (step 908), with the operation ending thereafter. The output of the extraction is an ordered set of accessed array locations, namely an ordered list of tupples (array, location within array, type of access, namely read or write, or the like), where the tupples are ordered in the order in which they are encountered in the original program.

FIG. 10 depicts an example of the operation performed by a dependence computation module of a dependence-aware scheduling mechanism at runtime in accordance with an illustrative embodiment. As the operation begins, the dependence computation module allocates and initializes version arrays and other data structures for each array location accessed by the original program (step 1002), which is further described in FIGS. 11, 12, and 13 that follow. The dependence computation module then selects the first iteration in the original program in the order that has not yet been processed (step 1004). The dependence computation module then generates an ordered list of tupples from the iteration i using the computed dependence slices (step 1006). The dependence computation module then selects the first tupple in the ordered list (step 1008). Then the dependence computation module processes the tupple using one or a set of dependence analyzing algorithms (step 1010), which will be described in FIGS. 11, 12, and 13 that follow.

Once the tupple has been processed, the dependence computation module outputs a sequence of iterations this iteration depends on (step 1012). The dependence computation module also outputs distance information from the current iteration to the latest dependent iteration that the current iteration depends on (step 1014). The dependence computation module then determines if there is another unprocessed tupple in the iteration (step 1016). If at step 1016 there is another unprocessed tupple, then the operation returns to step 1008. If at step 1016 there is not another unprocessed tupple, then the dependence computation module determines if there is another unprocessed iteration in the original program step 1018. If at step 1018 there is another unprocessed iteration, then the operation returns to step 1004. If at step 1018 there is not another unprocessed iteration, then the dependence computation module notifies the scheduler thread that the dependence computation has completed (step 1020).

Figure 11A:
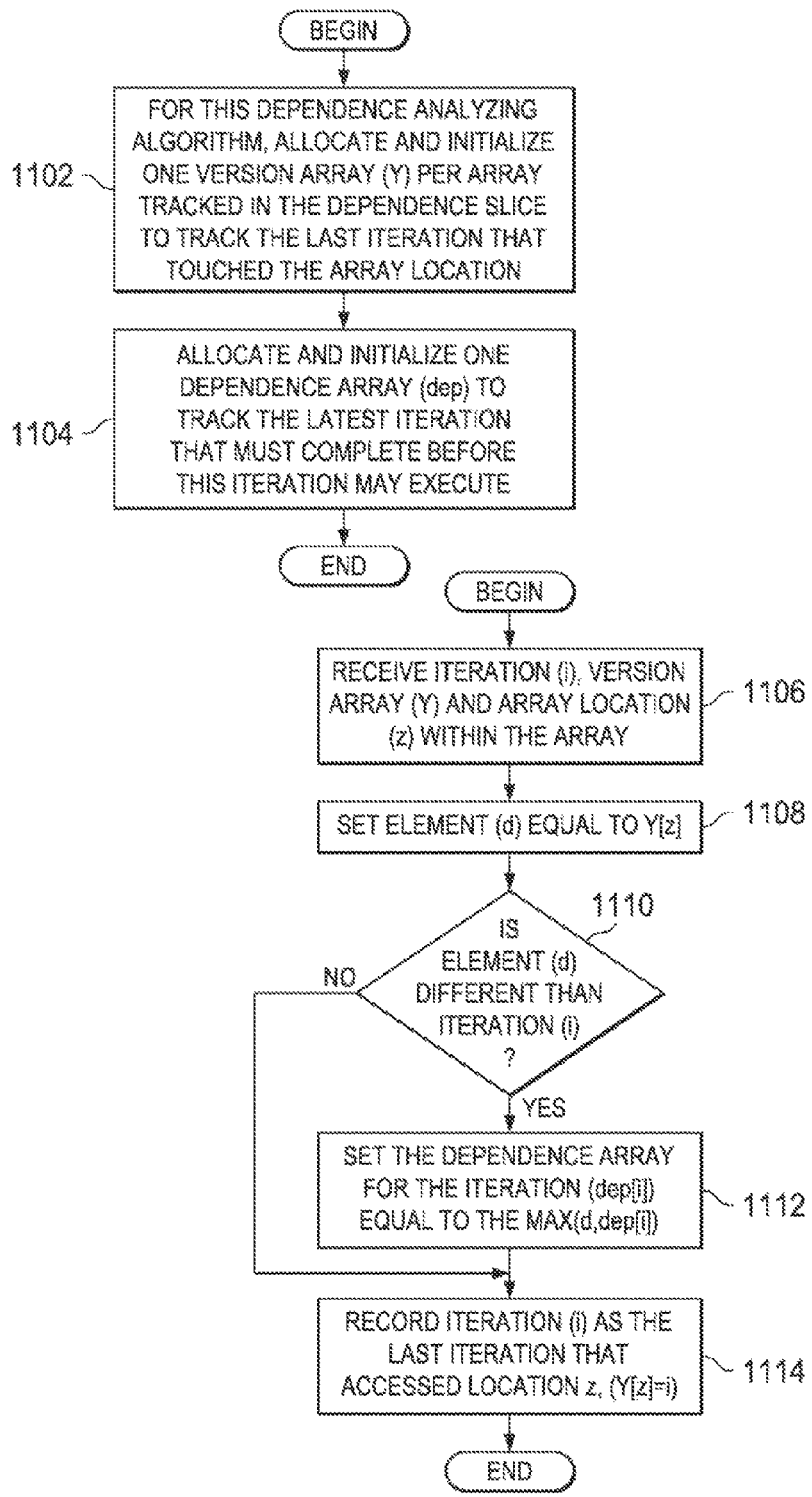
FIG. 11A depicts one example of a dependence analyzing algorithm that may be executed by a dependence computation module in accordance with an illustrative embodiment.

FIG. 11A depicts one example of a dependence analyzing algorithm that may be executed by a dependence computation module in accordance with an illustrative embodiment. This example of the dependence analyzing algorithm is an instance where an approximate dependence graph is built using a last access representation. For this dependence analyzing algorithm, as the operation begins, the dependence computation module allocates and initializes one version array Y per array tracked in the dependence slice to track the last iteration that touched, either through a read or a write, that array location (step 1102). An example of suitable initial values is as follows. If the iteration is part of a loop that iterates from 0 to N, then suitable initial values are numbers smaller than 0 (i.e. smaller than the lower bound). This smaller value is then interpreted as an array value not having been touched yet within the scope of the loop. The dependence computation module also allocates and initializes one dependence array dep to track the latest iteration that must complete before this iteration may execute (step 1104), with the operation ending thereafter. Suitable initial values are the same as for the initial values for the version arrays. Steps 1102 and 1104 are the specific operations performed for this example of the dependence analyzing algorithm which correspond to step 1002 of FIG. 10.

Likewise, the description of steps 1106 through 1114 expand on the operation performed by dependence computation module in step 1010 of FIG. 10. Once the data structures and version arrays have been allocated, the dependence computation module receives iteration i, version array Y, and array location z within the array (step 1106). The dependence computation module then sets element d equal to Y[z] (step 1108). Then, the dependence computation module determines if element d is different than iteration i (step 1110). If at step 1110 element d is different than iteration i, then dependence computation module sets the dependence array for the iteration dep[i] equal to the maximum of either element d or dependence array for the iteration dep[i] (step 1112). From step 1112 or if at step 1110 element d is not different than iteration i, then dependence computation module records iteration i as the last iteration that accessed location z (Y[z]=i) (step 1114), with the operation performed by this example of a dependence analyzing algorithm terminating thereafter.

Figure 11B:
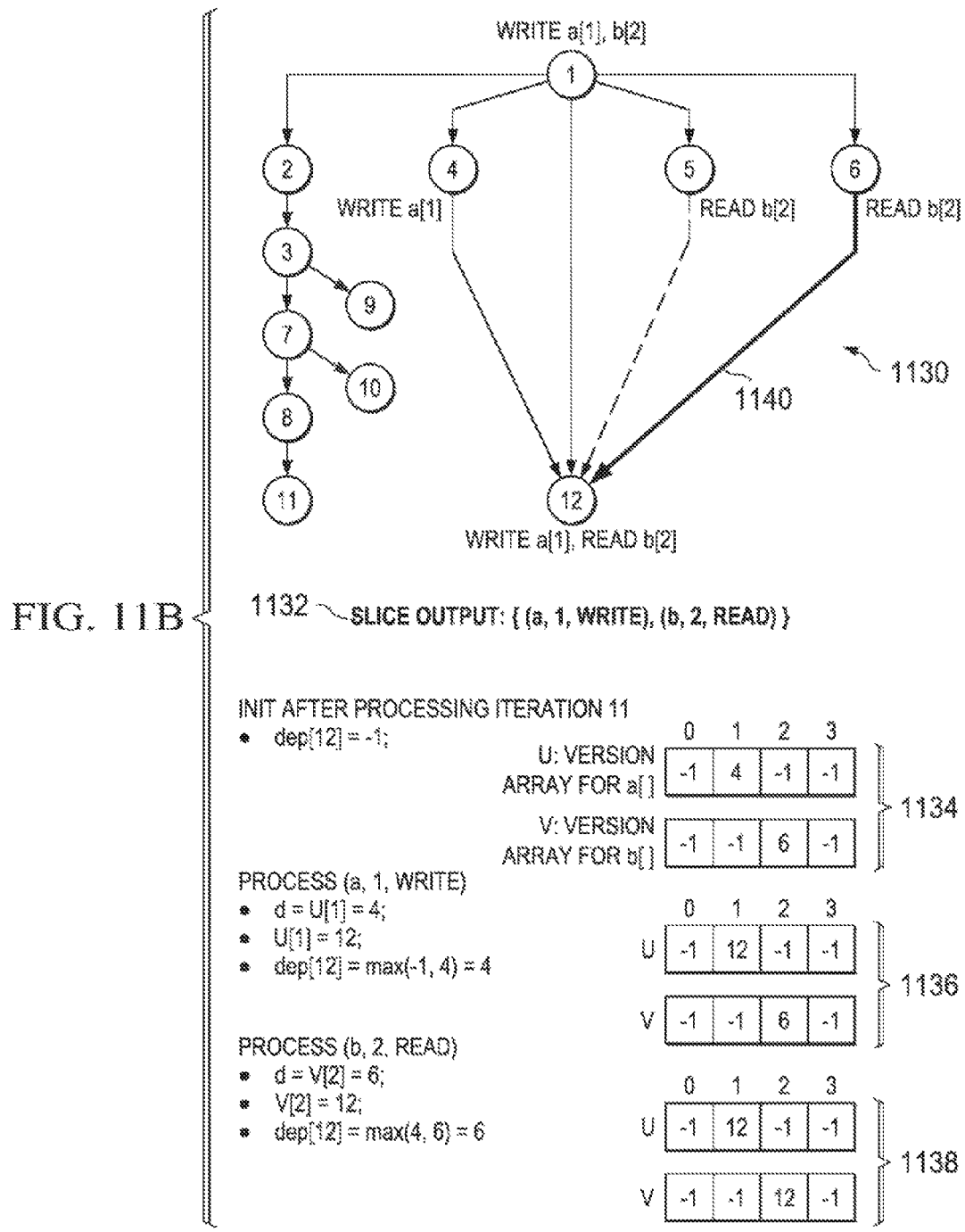
FIG. 11B depicts an example of the dependence analyzing algorithm described in FIG. 11A in accordance with an illustrative embodiment.

FIG. 11B depicts an example of the dependence analyzing algorithm described in FIG. 11A in accordance with an illustrative embodiment. In this illustration, the dependence computation module determines the dependency of iteration 12 as shown in dependence graph 1130. The dependence computation module receives dependence slice output 1132 from a compiler that indicates that iteration 12 writes to array a array location 1, a[1], and reads from array b array location 2, b[2]. After processing iteration 11, the dependence computation module sets the dependence of iteration 12 dep[12] equal to −1, which indicates that no dependence has been identified. Version arrays 1134 represent the temporary array for each array accessed in the loop body that might involve loop-carried dependences. Version array U is the version array for array a accessed by the loop body in the original program and version array V is the version array for array b accessed by the loop body accessed in the original program.

As the dependence computation module executes this dependence analyzing algorithm, the dependence computation module processes the first access which is a write to array a location 1. The dependence computation module sets element d equal to 4, which is the current iteration indicated in version array U location 1, U[1]. The dependence computation module also sets U[1] equal to 12 as the last iteration to access that array and location as is shown in version arrays 1136. The dependence computation module then sets the dependence of iteration 12 dep[12] equal to the maximum between the previous dependence of iteration 12, which is −1, and the element d, which is 4. Thus, the dependence of iteration 12 dep[12] is set to 4.

The dependence computation module then processes the next access which is a read to array b location 2. The dependence computation module sets element d equal to 6, which is the current iteration indicated in version array V location 2. The dependence computation module also sets V[2] equal to 12 as the last iteration to access that array and location as is shown in version arrays 1138. The dependence computation module then sets the dependence of iteration 12 dep[12] equal to the maximum between the previous dependence of iteration 12, which is 4, and the element d, which is 6. Thus, the dependence of iteration 12 dep[12] is set to 6. Edge 1140 depicts the equivalence of the dependence of iteration 12 dep[12] being set to 6.

Figure 12A:
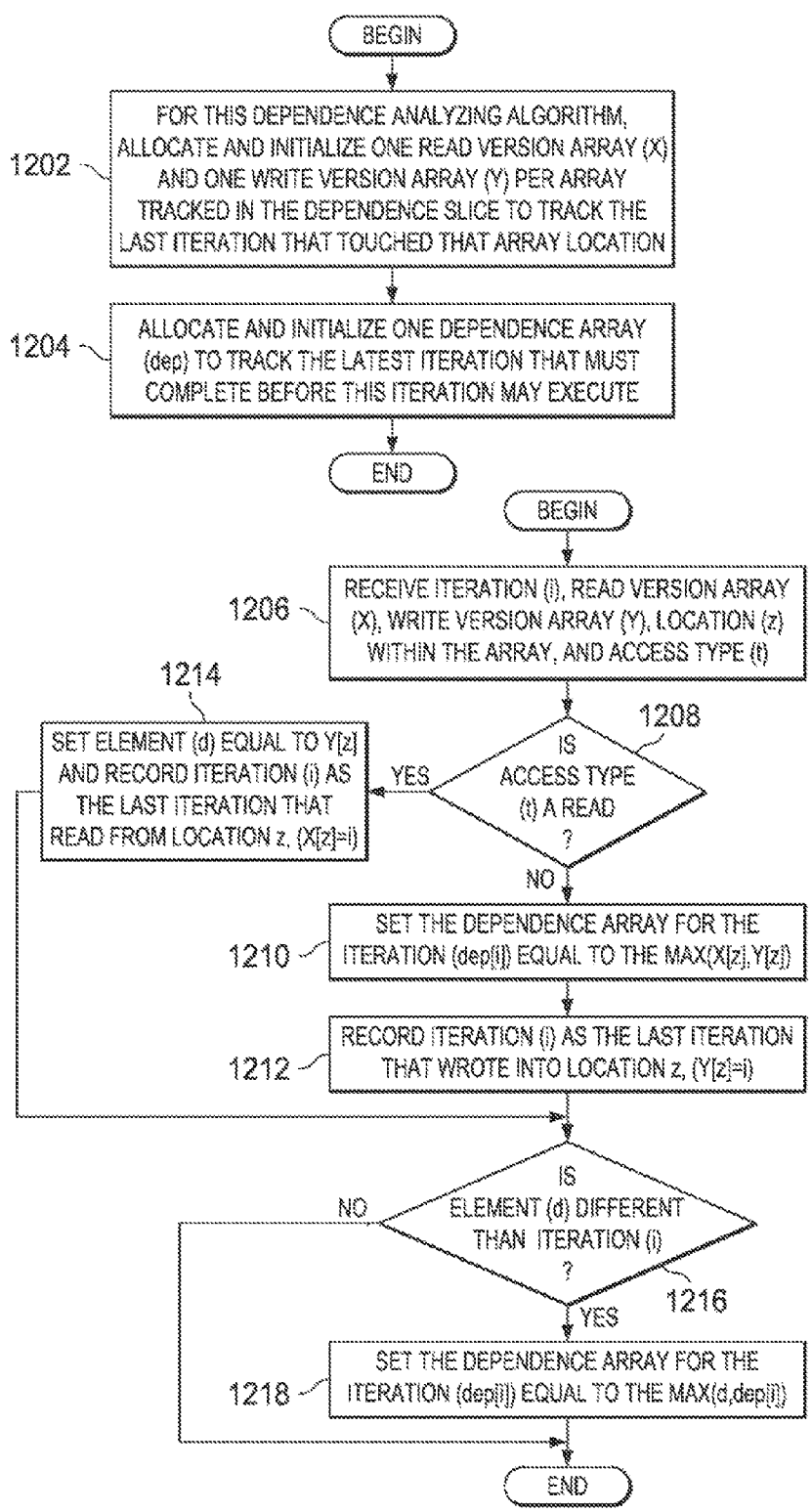
FIG. 12A depicts another example of a dependence analyzing algorithm that may be executed by a dependence computation module in accordance with an illustrative embodiment.

FIG. 12A depicts another example of a dependence analyzing algorithm that may be executed by a dependence computation module in accordance with an illustrative embodiment. This example of the dependence analyzing algorithm is an instance where an approximate dependence graph is constructed using a representation that keeps track of a last read access and a last write access. For this dependence analyzing algorithm, as the operation begins, the dependence computation module allocates and initializes one-read version array X and one write version array Y per array tracked in the dependence slice to track the last iteration that touched, either through a read or a write, that array location (step 1202). The dependence computation module also allocates and initializes one dependence array dep to track the latest iteration that must complete before this iteration may execute (step 1204), with the operation terminating thereafter. Steps 1202 and 1204 are the specific operations performed for this example of the dependence analyzing algorithm which correspond to step 1002 of FIG. 10. Suitable initial values are similar to initial values used for steps 1102 and 1104 in FIG. 11.

Likewise, the description of steps 1206 through 1218 expand on the operation performed by dependence computation module in step 1010 of FIG. 10. Once the data structures and version arrays have been allocated, the dependence computation module receive iteration i, read version array X, write version array Y, array location z within the array, and access type t (step 1206). The dependence computation module then determines if access type t is a read access (step 1208). If at step 1208 the access type t is not a read access, then the dependence computation module sets the dependence array for the iteration dep[i] equal to the maximum of either read version array X location z, X[z], or write version array Y location z, Y[z] (step 1210). The dependence computation module then records iteration i as the last iteration that wrote into location z (Y[z]=i) (step 1212). If at step 1208 the access is a read access, the dependence computation module sets element d equal to Y[z] and record iteration i as the last iteration that read from location z (X[z]=i) (step 1214).

From step 1212 or step 1214, the dependence computation module determines if element d is different than iteration i (step 1216). If at step 1216 element d is different than iteration i, then dependence computation module sets the dependence array for the iteration dep[i] equal to the maximum of either element d or dependence array for the iteration dep[i] (step 1218). From step 1218 or if at step 1216 element d is not different than iteration i, with the operation performed by this example of a dependence analyzing algorithm terminating thereafter.

Figure 12B:
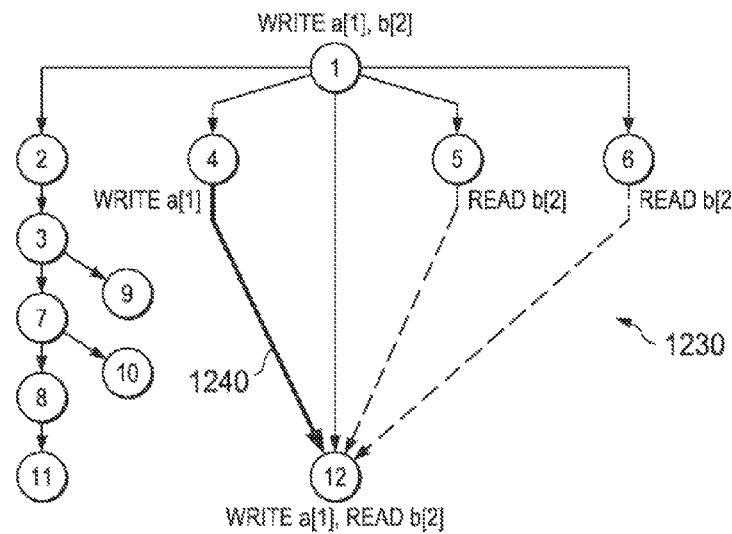
FIG. 12B depicts an example of the dependence analyzing algorithm described in FIG. 12A in accordance with an illustrative embodiment.

FIG. 12B depicts an example of the dependence analyzing algorithm described in FIG. 12A in accordance with an illustrative embodiment. In this illustration, the dependence computation module is determining the dependency of iteration 12 as shown in dependence graph 1230. The dependence computation module receives dependence slice output 1232 from a compiler that indicates that iteration 12 writes to array a array location 1, a[1], and reads from array b array location 2, b[2]. After processing iteration 11, the dependence computation module sets the dependence of iteration 12 dep[12] equal to −1, which indicates that no dependence has been identified. Version arrays 1234 represent the temporary array for each array accessed in the loop body that might involve loop-carried dependences. Version array Ur is the read version array for array a accessed by the loop body in the original program and version array Uw is the write version array for array a accessed by the loop body accessed in the original program. Version array Vr is the read version array for array b accessed by the loop body in the original program and version array Vw is the write version array for array b accessed by the loop body accessed in the original program.

As the dependence computation module executes this dependence analyzing algorithm, the dependence computation module processed the first access which is a write to array a location 1. The dependence computation module sets element d equal to the maximum between read version array Ur location 1, Ur[1], and write version array Uw location 1, Uw[1], which is the maximum between 4 and −1. Thus, clement d is set equal to 4. The dependence computation module also sets Uw[1] equal to 12 as the last iteration to access that array and location as is shown in version arrays 1236. The dependence computation module then sets the dependence of iteration 12 dep[12] equal to the maximum between the previous dependence of iteration 12, which is −1, and the element d, which is 4. Thus, the dependence of iteration 12 dep[12] is set to 4.

The dependence computation module then processes the next access which is a read to array b location 2. The dependence computation module sets element d equal to 1, which is the current iteration indicated in write version array Vw location 2. The dependence computation module also sets Vr[2] equal to 12 as the last iteration to access the read version array and location as is shown in version arrays 1238. The dependence computation module then sets the dependence of iteration 12 dep[12] equal to the maximum between the previous dependence of iteration 12, which is 4, and the element d, which is 1. Thus, the dependence of iteration 12 dep[12] is set to 4. Edge 1240 depicts the equivalence of the dependence of iteration 12 dep[12] being set to 4.

FIG. 13 depicts a third example of a dependence analyzing algorithm that may be executed by a dependence computation module in accordance with an illustrative embodiment. This example of the dependence analyzing algorithm is for instance when there is a dependence graph. For this dependence analyzing algorithm, as the operation begins, the dependence computation module allocates and initializes one read version array X indicating the set of read iterations that last read the array location z and one write version array Y indicating the last write iteration that wrote that array location z (step 1302). Suitable initial values are the same as the ones used in step 1102 in FIG. 11. The dependence computation module also allocates and initializes one dependence graph G (step 1304), with the operation ending thereafter. The graph is initialized as having one node per iteration and no dependence edges among iterations. Steps 1302 and 1304 are the specific operations performed for this example of the dependence analyzing algorithm which correspond to step 1002 of FIG. 10.

Likewise, the description of steps 1306 through 1324 expand on the operation performed by dependence computation module in step 1010 of FIG. 10. Once the data structures and version arrays have been allocated, the dependence computation module receives iteration i, read version array X, write version array Y, array location z within the array, access type t, and dependence graph G (step 1306). The dependence computation module then determines if the access type t is a read access (step 1308). If at step 1308 the access type t is not a read access, then the dependence computation module selects an unprocessed element d in the union of X[z] and Y[z] (step 1310). The dependence computation module then determines if element d is different than iteration i (step 1312). If at step 1312 element d is different than iteration i, then dependence computation module adds an edge in dependence graph G from element d to iteration i (step 1314). From step 1314 or if at step 1312 element d is not different than iteration i, the dependence computation module then determines if there are more unprocessed elements (step 1316). If at step 1316 there are more unprocessed elements, then the operation returns to step 1310. If at step 1316 there are no more unprocessed elements, then the dependence computation module sets the Y[z] equal to iteration i (step 1318) and sets X[z] equal to empty (step 1320) with the operation performed by this example of a dependence analyzing algorithm terminating thereafter.

Returning to step 1308, if at step 1308 the access type t is a read access, the dependence computation module sets element d equal to Y[z] (step 1322). The dependence computation module adds iteration i to the set of location X[z] (step 1324). The dependence computation module then determines if element d is different than iteration i (step 1326). If at step 1326 element d is different than iteration i, then dependence computation module adds an edge in dependence graph G from element d to iteration i (step 1328). From step 1328 or if at step 1326 element d is not different than iteration i, then the operation performed by this example of a dependence analyzing algorithm terminates.

Figure 14:
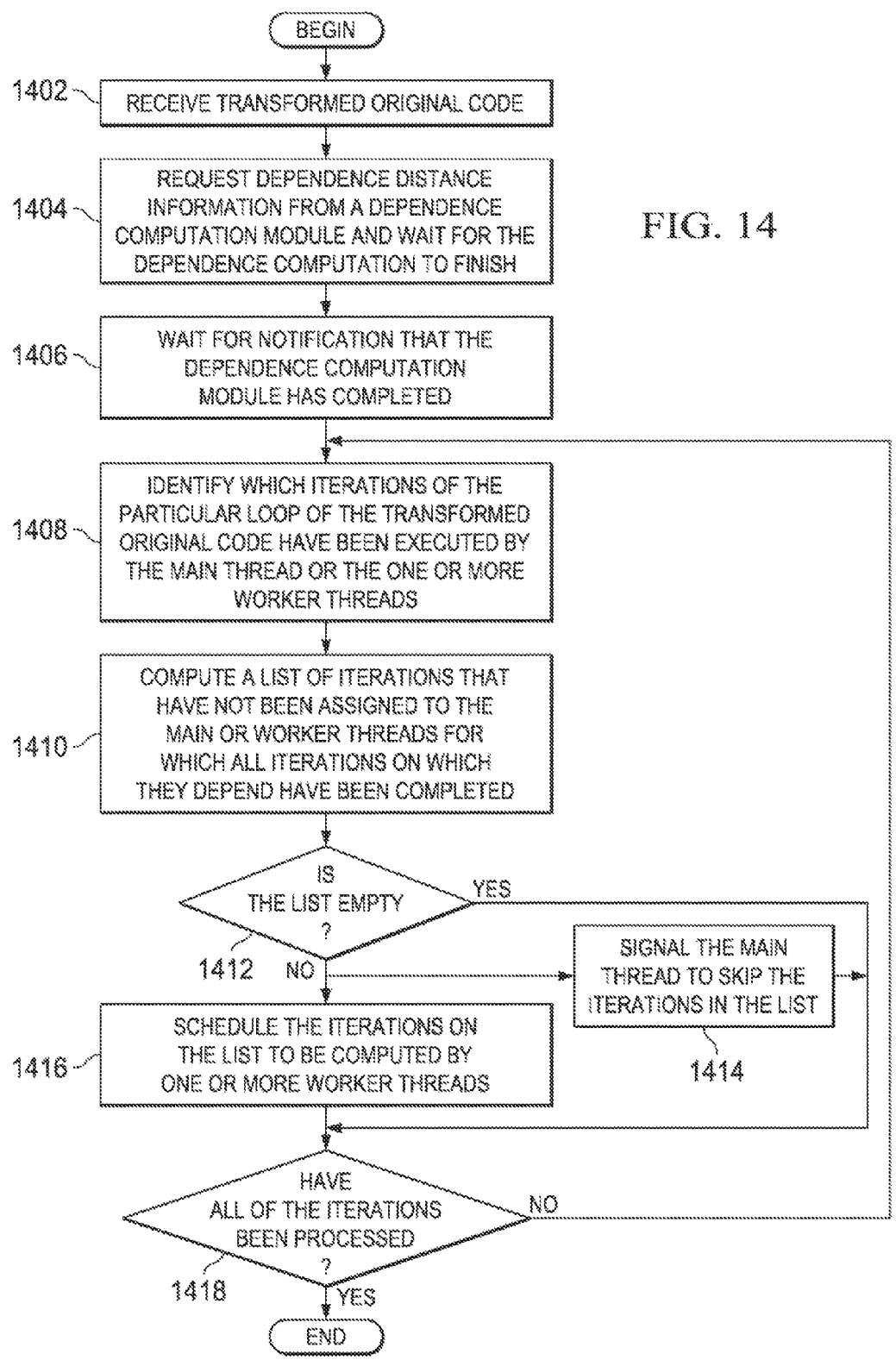
FIG. 14 depicts an example of the operations performed, by a scheduler thread of a dependence-aware scheduling mechanism in accordance with an illustrative embodiment.

FIG. 14 depicts an example of the operations performed by a scheduler thread of a dependence-aware scheduling mechanism in accordance with an illustrative embodiment. As the operation begins, a scheduler thread receives transformed original code (step 1402). The scheduler thread requests dependence distance information from a dependence computation module and waits for the dependence computation to finish (step 1404). The scheduler thread then waits for a notification that the dependence computation module has completed (step 1406). Once the notification has been received, the scheduler thread identifies which iterations of the particular loop of the transformed original code have been executed by the main thread or one or more worker threads (step 1408). The scheduler thread computes a list of iterations that have not been assigned to the main or worker threads for which all iterations on which they depend have been completed (step 1410).

The scheduler thread then determines if the list of iterations is empty (step 1412). If at step 1412 the list is non-empty, the scheduler thread signals the main thread to skip the iterations in the list (step 1414) and the scheduler schedules the iterations on the list to be executed by one or more worker threads (step 1416). From steps 1414 and 1416 or if at step 1412 the list is empty, the scheduler thread then determines if all of the iterations have been processed (step 1418). If at step 1418 all iterations have not been processed, the operation returns to step 1408. If at step 1418 all iterations have been processed, then the operation ends.

Figure 15:
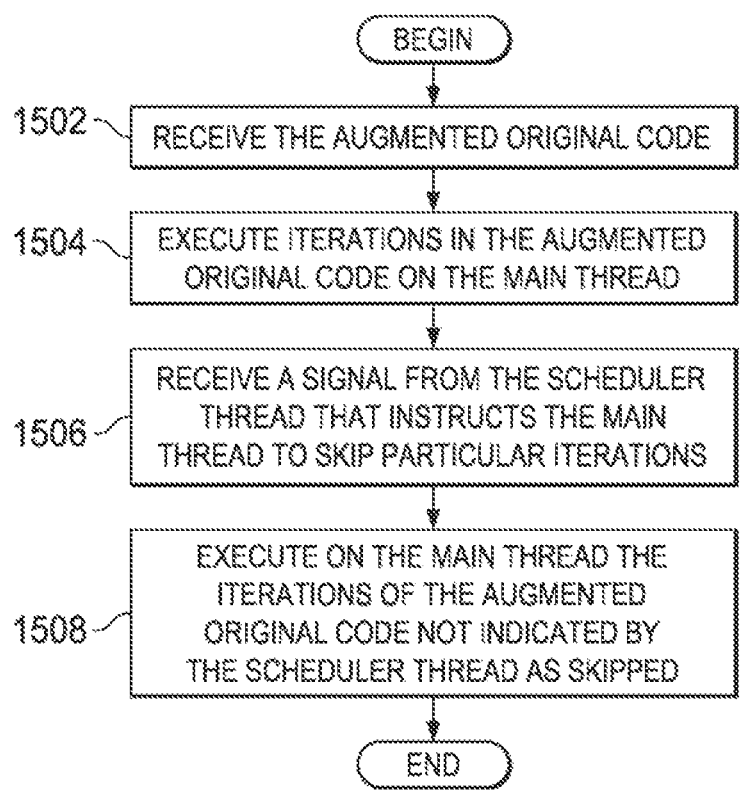
FIG. 15 depicts an example of the operation performed by a main thread and one or more worker threads of a dependence-aware scheduling mechanism in accordance with an illustrative embodiment.

FIG. 15 depicts an example of the operation performed by a main thread and one or more worker threads of a dependence-aware scheduling mechanism in accordance with an illustrative embodiment. As the operation begins, the main thread receives the augmented original code (step 1502). The main thread begins to execute the iterations in the augmented original code on a main thread (step 1504). During the execution, the main thread receives a signal from a scheduler thread that instructs the main thread to skip particular iterations that have been executed ahead-of-time on one or more worker threads in the data processing system (step 1506). Using these signals, the main thread executes only the iterations of the augmented original code not indicated as being skipped by the scheduler thread (step 1508), with the operation ending thereafter. The signal from the scheduler thread may be asynchronous. For example, the scheduler thread simply sets a bit in a bit vector indicating that the particular iteration has been skipped. When main thread reaches the beginning of that iteration, the main thread checks the bit vector and decides to skip the iteration.

Thus, the illustrative embodiments provide mechanisms for a dependence-aware scheduling mechanism that schedules independent iterations so that the independent iterations are scheduled and executed ahead-of-time in parallel with other iterations. Threads or threads on cores in a multi-core chip, other than the main thread which is already executing iterations, are used to compute dependences within a loop as the loop executes. The other threads or threads on cores feed this information to a scheduler thread that is able to parallelize some of the iterations across other threads operating simultaneously. Then, the scheduler thread instructs the main thread to skip some iterations and the scheduler thread schedules the skipped iterations to be executed ahead-of-time.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for a runtime dependence-aware scheduling of dependent iterations, the method comprising:

receiving computer executable code that contains a plurality of iterations;

executing one or more iterations in the plurality of iterations of the computer executable code by a main thread; and while the one or more iterations in the plurality of iterations are being executed by the main thread:

determining dependence information for a plurality of memory accesses within the computer executable code, wherein determining the dependence information is performed using a set of dependence threads in the data processing system;

using the dependence information, determining whether a subset of a set of uncompleted iterations in the plurality of iterations is capable of being executed ahead-of-time by a set of worker threads in the data processing system, wherein the plurality of iterations comprises at least one completed iteration that has been executed by the main thread;

responsive to a determination that the subset of the set of uncompleted iterations in the plurality of iterations is capable of being executed ahead-of-time, signaling the main thread to skip the subset of the set of uncompleted iterations; and signaling the set of worker threads in the data processing system to execute the subset of the set of uncompleted iterations ahead of a time when the subset of uncompleted iteration would normally he executed.

2. The method of claim 1, wherein the dependence information is represented as the distance between a current iteration and a last iteration to which the current iteration is dependent on using an order of the iteration in the computer executable code.

3. The method of claim 1, wherein determining the dependence information for the plurality of memory accesses within the computer executable code further comprises:

determining whether the dependence information has not changed from a prior execution of the plurality of iterations;

responsive to a determination that the dependence information has not changed, retrieving prior dependence information; and responsive to a determination that the dependence information has changed or upon determining that the prior dependence information cannot be retrieved, determining the dependence information, is performed using at least one of the set of dependence threads or the set of worker threads in the data processing system.

4. The method of claim 1, wherein determining the dependence information for the plurality of memory accesses within the computer executable code comprises:

allocating and initializing version arrays and data structures for each array accessed by the computer executable code and monitored by a set of computed dependence slices extracted from the computer executable code;

for each iteration in the plurality of iterations, generating an ordered list of tupples generated from the iteration using the set of computed dependence slices;

for each tupple in the ordered list of tupples, processing the tupple using one of a set of dependence analyzing algorithms;

using the results of the processing, outputting a sequence of iterations that the iteration depends on; and outputting distance information from the iteration to the latest dependent iteration that the iteration depends on.

5. The method of claim 4, further comprising:

once all iterations in the plurality of iterations have been processed, sending a notification to a scheduler indicating that the dependence computation has completed.

6. The method of claim 4, wherein allocating and initializing the version arrays and the data structures comprises:

allocating and initializing one read version array per array and one write version array per array tracked in a dependence slice in the set of computed dependence slices, wherein the one read version array tracks the last iteration that read each element of the array and one write version array tracks the last iteration that wrote each element of the array; and allocating and initializing one dependence array, wherein the one dependence array tracks the latest iteration that must complete before the iteration may execute.

7. The method of claim 6, wherein processing the tupple using one of a set of dependence analyzing algorithms further comprises:

receiving an iteration, read version array, write version array, array location within the array, and access type;

determining whether the access type associated with the tupple is at least one of a read command or a write command;

responsive to the access type being a write command, setting the one element value equal to a maximum of either the read version array and the array location for the iteration or the write version array and the array location for the iteration;

recording the iteration as the last iteration that wrote into the array and the array location;

determining whether the element value is different than the iteration; and responsive to the element value being different than the iteration, setting a value of the one dependence array for the iteration equal to the maximum of either the element value or the dependence array value for the iteration.

8. The method of claim 7, further comprising:

responsive to the access type being a read command, setting an element value equal to the write version array and the array location for the iteration;

recording the iteration as the last iteration that read from the array and the array location;

determining whether the element value is different than the iteration; and responsive to the element value being different than the iteration, setting a value of one dependence array for the iteration equal to the maximum of either the element value or the dependence array for the iteration.

9. The method of claim 4, wherein allocating and initializing the version arrays and the data structures comprises:

allocating, and initializing one read version array per array and one write version array per array tracked in a dependence slice in the set of computed dependence slices, wherein the one read version array tracks the set of iterations that last read each location of the array and one write version array that tracks the last iteration that wrote each location of the array; and allocating and initializing one dependence graph.

10. The method of claim 9, wherein processing the tupple using one of a set of dependence analyzing algorithms further comprises:

receiving an iteration, read version array, write version array, array location, access type, and dependence graph, determining whether the access type associated with the tupple is at least one of a read command or a write command;

responsive to the access type being a write command, selecting an element value in a union of the read version array and array location and the write version array and array location;

determining whether the element value is different than the iteration;

responsive to the element value being different than the iteration, adding an edge in the dependence graph from the element value to the iteration;

determining whether there are more unprocessed elements in the union of the read version array and array location and the write version array and array location;

responsive to an absence of any more unprocessed elements, setting the write version array and the array location equal to the iteration; and setting the read version array and the array location to empty.

11. The method of claim 10, further comprising:

responsive to the access type being a read command, setting the element value equal to the write version array and the array location for the iteration;

adding the iteration to the read version array and the array location for the iteration;

determining whether the element value is different than the iteration; and responsive to the element value being different than the iteration, adding an edge in the dependence graph from the element value to the iteration.

12. The method of claim 1, wherein a scheduling thread orchestrates the main thread, the set of dependence threads, and the set of worker threads to perform actions comprising:

receiving transformed original code;

requesting dependence distance information from a dependence computation module that uses the set of dependence threads;

upon receiving the dependence distance information, identifying a set of iterations of a particular loop of the transformed original code that have been executed by the main thread;

computing a list of iterations that have not been assigned to the main thread or the set of worker threads for which all iterations on which they depend have been completed;

determining whether the list of iterations is empty;

responsive to the list of iterations failing to be empty, signaling the main thread to skip the subset of the set of uncompleted iterations; and signaling the set of worker threads in the data processing system to execute the subset of the set of uncompleted iterations.

13. A computer program product comprising a non-transitory computer readable medium having a computer readable program recorded thereon, wherein the computer readable program, when executed on a computing device, causes the computing device to:

receive computer executable code that contains a plurality of iterations;

execute one or more iterations in the plurality of iterations of the computer executable code by a main thread; and while the one or more iterations in the plurality of iterations are being executed by the main thread:

determine dependence information for a plurality of memory accesses within the computer executable code, wherein determining the dependence information is performed using a set of dependence threads in the data processing system;

using the dependence information, determine whether a subset of a set of uncompleted iterations in the plurality of iterations is capable of being executed ahead-of-time by a set of worker threads in the data processing system, wherein the plurality of iterations comprises at least one completed iteration that has been executed by the main thread;

responsive to a determination that the subset of the set of uncompleted iterations in the plurality of iterations is capable of being executed ahead-of-time, signal the main thread to skip the subset of the set of uncompleted iterations; and signal the set of worker threads m the data processing system to execute the subset of the set of uncompleted iterations ahead of a time when the subset of uncompleted iteration would normally be executed.

14. The computer program product of claim 13, wherein the dependence information is represented as the distance between a current iteration and a last iteration to which the current iteration is dependent on using an order of the iteration in the computer executable code.

15. The computer program product of claim 13, wherein the computer readable program to determine the dependence information for the plurality of memory accesses within the computer executable code further causes the computing device to:

determine whether the dependence information has not changed from a prior execution of the plurality of iterations;

responsive to a determination that the dependence information has not changed, retrieve prior dependence information; and responsive to a determination that the dependence information has changed or upon determining that the prior dependence information cannot he retrieved, determine the dependence information is performed using at least one of the set of dependence threads or the set of worker threads in the data processing system.

16. An apparatus, comprising:

a processor; and a memory coupled to the processor, wherein the memory comprises instructions which, when executed by the processor, cause the processor to:

receive computer executable code that contains a plurality of iterations;

execute one or more iterations in the plurality of iterations of the computer executable code by a main thread; and while the one or more iterations in the plurality of iterations are being executed by the main thread:

determine dependence information for a plurality of memory accesses within the computer executable code, wherein determining the dependence information is performed using a set of dependence threads in the data processing system;

using the dependence information, determine whether a subset of a set of uncompleted iterations in the plurality of iterations is capable of being executed ahead-of-time by a set of worker threads in the data processing system, wherein the plurality of iterations comprises at least one completed iteration that has been executed by the main thread;

responsive to a determination that the subset of the set of uncompleted iterations in the plurality of iterations is capable of being executed ahead-of-time, signal the main thread to skip the subset of the set of uncompleted iterations; and signal the set of worker threads in the data processing system to execute the subset of the set of uncompleted iterations ahead of a time when the subset of uncompleted iteration would normally be executed.

17. The apparatus of claim 16, wherein the dependence information is represented as the distance between a current iteration and a last iteration to which the current iteration is dependent on using an order of the iteration in the computer executable code.

18. The apparatus of claim 16, wherein the instructions to determine the dependence information for the plurality of memory accesses within the computer executable code further causes the processor to:

determine whether the dependence information has not changed from a prior execution of the plurality of iterations;

responsive to a determination that the dependence information has not changed, retrieve prior dependence information; and responsive to a determination that the dependence information has changed or upon determining that the prior dependence information cannot be retrieved, determine the dependence information is performed using at least one of the set of dependence threads or the set of worker threads in the data processing system.

* * * * *